Figure 1:
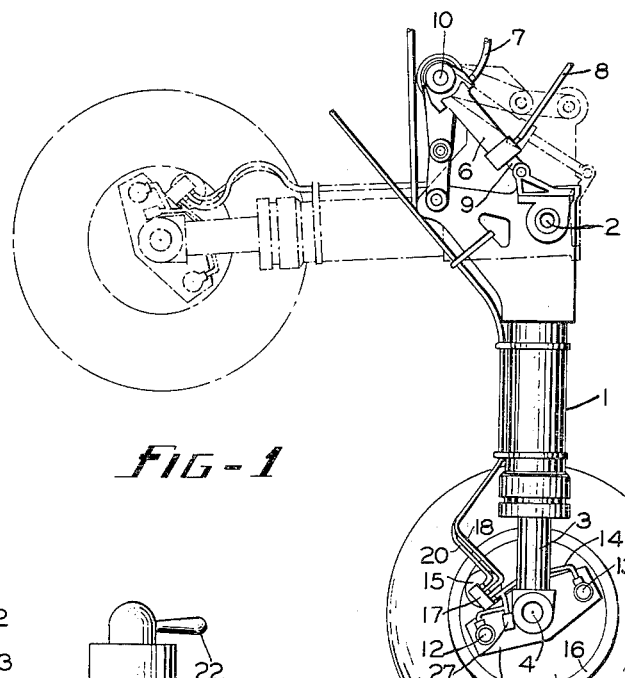

Jan. 23, 1962  A. J. BENT  3,018,073
AIRCRAFT BRAKE STABILIZING ARRANGEMENT
Filed Oct. 7, 1957

INVENTOR.
ARTHUR J. BENT
BY
ATTORNEY

United States Patent Office 3,018,073
Patented Jan. 23, 1962

3,018,073
AIRCRAFT BRAKE STABILIZING ARRANGEMENT
Arthur J. Bent, Pittsburgh, Pa., assignor to Westinghouse Air Brake Company, Wilmerding, Pa., a corporation of Pennsylvania
Filed Oct. 7, 1957, Ser. No. 688,466
4 Claims. (Cl. 244—111)

This invention relates to aircraft having retractable landing gear and an anti-wheel-slide brake controller for each landing wheel, and more particularly relates to a wheel brake stabilizing arrangement for such aircraft for preventing undesired release of aircraft brakes by unintended operation of said controller due to undesirable flexure of the landing gear.

It has been found that when a relatively heavy service application of brakes is initiated, brakes will be applied quite smoothly due to an initial time lag during which hydraulic fluid under pressure is displaced to the brake cylinders and meanwhile the drag on the wheels will gradually cause the relatively long, approximately six foot landing gears to be flexed or cantilevered backward from their normal unflexed positions relative to their respective points of support by the aircraft fuselage. However, if the rate of retardation of the landing wheels tends to become excessive, a valve device associated with each of the conventional anti-wheel-slide controller devices for the respective wheels will operate to effect a quick release of brake cylinder pressure for preventing wheel slide. When this occurs, the release of the wheel drag will cause the flexed landing gear to spring forward beyond its normal position and cause the associated anti-wheel-slide controller device to promptly restore brake cylinder pressure to the operator-selected pressure provided in the hydraulic brake control line. As brakes are reapplied, the resulting wheel drag will cause the flexed landing gear to spring backward and cause the aforementioned valve device to quickly release brake cylinder pressure. Thus, brakes will be alternatively released and reapplied in rapid succession, with the result that brake cylinder pressure will cycle according to, and in phase with, the cycling frequency of the landing gear in flexing back and forth relative to its normal position, and set up a feed-back relationship whereby cycling of brake cylinder pressure causes oscillation and reverse flexing of the landing gear and vice versa.

This undesired flexing or oscillation of the landing gear, which is referred to in the aircraft art as "walking," results in uneven braking of the aircraft, undesirably longer distances to bring the aircraft to taxiing speed or to a complete stop, and considerable vibration or shaking of the aircraft. This condition is especially serious on relatively light planes, with relatively thin wings and long slender landing gear, where the landing gear was found to flex about four or five inches in either direction from normal position.

It is therefore the principal object of this invention to provide an aircraft brake control system embodying a novel brake stabilizing arrangement for overcoming the above-described difficulties.

According to this object, the improved aircraft brake control system comprises a relatively small preloaded accumulator which is interposed in a branch of the hydraulic line leading from the anti-wheel-slide controller to the brake cylinders for each wheel, and serves to eliminate "walking" by reducing the cycling frequency of the brake cylinder pressure and thereby throwing it out of phase with the natural frequency of the landing gear.

Figure 2:
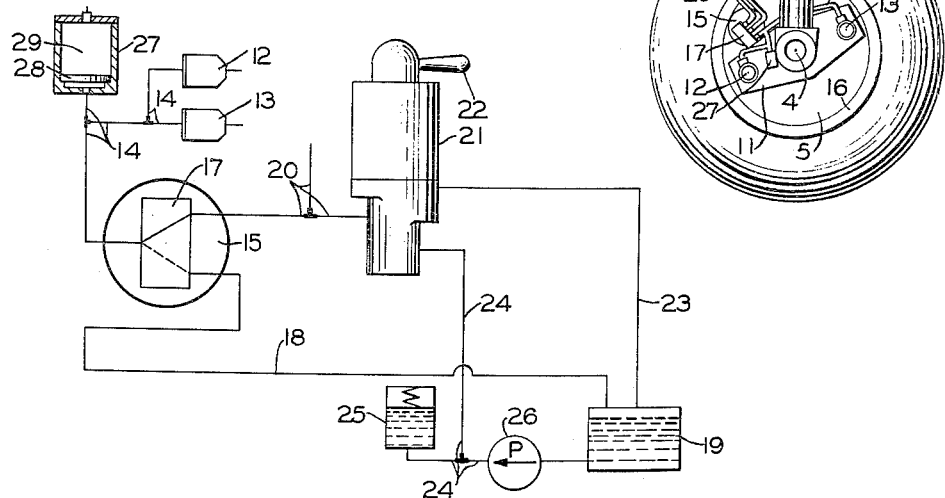

Other objects and advantages will become apparent from the following more detailed description of the invention and from the accompanying drawing, wherein FIG. 1 is a side elevational view of an aircraft retractable landing gear with which the improved brake control system is shown associated; and FIG. 2 is a diagrammatic view of the improved brake control system.

Description

In FIG. 1 of the drawing, there is shown a retractable landing gear comprising a strut assemblage 1 which is hingedly connected by a shaft 2 to the airplane fuselage (not shown); a cylindrical rod 3 telescopingly mounted in the assemblage 1 and connected at its lower end to a non-rotatable axle 4 on which an airplane wheel 5 is journalled; a double-acting hydraulic jack or cylinder 6 of conventional type which responds to concurrent supply of hydraulic fluid under pressure to a line 7 and release of hydraulic fluid under pressure from a line 8 to retract the landing gear to the position designated by broken lines, and responds to concurrent supply of hydraulic fluid under pressure to line 8 and release of such fluid from line 7 to lower the landing gear to the position shown in solid lines, the piston (not shown) of said cylinder having a piston rod 9 projecting exteriorly of said cylinder and pivotally connected to the strut assemblage in eccentric relation to the shaft 2, and the other end of said cylinder being rockably fulcrumed on a shaft 10 carried by the fuselage.

Nonrotatably secured to, and at one side of, the strut assemblage 1 is a mounting bracket 11 on opposite arms of which are mounted brake cylinders 12, 13 that, when supplied with hydraulic fluid under pressure via a common brake cylinder line 14, effect braking engagement of a brake plate or disc (not shown) with a braking surface (not shown) provided on the wheel 5.

An anti-wheel-slide controller device, which may be of the type disclosed in U.S. Patent 2,656,017, granted October 20, 1953, to H. W. Trevaskis, is provided for so controlling the pressure of fluid in the brake cylinders 12, 13 that upon an excessive rate of retardation of the wheel 5 upon existing conditions of ground speed, aircraft weight and traction, the operator selected hydraulic braking pressure will be relieved sufficently to prevent skidding of said wheel. The controller device comprises, briefly, a rotatable housing 15 having an outer friction surface such as a rubber tire fixed thereon which engages the inner surface of an annular flange 16 formed on the wheel 5. An inertia element in the form of a flywheel (not shown) is rotatably mounted within the housing 15 and is rotated by rotation of the housing through a lost-motion connection permitting limited rotative angular movement of the flywheel relative to the housing responsively to rotative retardation of the wheel and consequently of the housing driven by the wheel. The controller device also comprises a valve device 17 operated in response to relative angular movement of the flywheel and the housing 15 upon retardation of the wheel 5 exceeding a certain rate from one position in which it connects the brake cylinder device 14 to a control line 20 (as shown by the solid line) to a second position in which it connects the brake cylinder line 14 to a release line 18 (as shown by the broken line) leading to a sump 19. In the said one position of valve device 17, communication is established via which an operator's brake valve device 21 may control the fluid pressure supplied to the brake cylinders 12 and 13. In the second position of the valve device 17, communication is established via which the fluid pressure in the brake cylinders 12 and 13 is reduced to the pressure in the sump 19, thereby effecting release of the brake application on the wheel 5. A branch of control line 20 leads to another valve device (not shown), similar to valve device 17 and associated with the other wheel (not shown) of the airplane, for controlling pressure in a brake cylinder line (not shown) which leads to the brake cylinders for said other wheel.

The brake valve device 21 may be of the type disclosed in U.S. Patent 2,324,910, granted July 20, 1943, to E. S. Cook and assigned to the assgnee of the present invention. This valve device comprises, briefly, self-lapping valve means (not shown) responsive to movement of a handle 22 to a release position to connect control line 20 to a pipe 23 leading to the sump 19 for causing venting of the brake cylinders 12, 13 via valve device 17 and responsive to horizontal arcuate movement of said handle from release position into an application zone to connect said control line to a supply line 24 for providing in said control line hydraulic fluid at a pressure corresponding to the degree of movement of said handle into said zone. Any suitable means may be provided for maintaining the supply pipe 24 charged with hydraulic fluid at a chosen pressure which is at least equal to, but preferably exceeds, the maximum or full service brake cylinder pressure which will be required; for example, hydraulic fluid in said supply pipe may be maintained charged to said chosen value by an accumulator 25 and a pump 26 which operates automatically to restore pressure in the pipe 24 and accumulator whenever such pressure drops below said chosen value.

According to the invention, there is provided an improved aircraft brake control system comprising, in addition to the elements above described, a relatively small accumulator 27 which may consist of a piston 28 slidably mounted in a casing and subject at one side to pressure of fluid in a branch of brake cylinder line 14 and subject at the opposite side to gas under pressure presupplied to and bottled up in a chamber 29 (or, if preferred, to pressure of a helical spring in said chamber). It will be understood, of course, that any other type of accumulator or surge absorbing device may be used, if preferred, and the invention is not intended to be limited to the particular accumulator construction shown.

I have found by actual tests of my improved aircraft brake control system that best results are obtained when the chamber 29 of the accumulator 27 is precharged with gas to a pressure which is approximately 25% of the normal full service brake cylinder pressure. With chamber 29 thus charged, the accumulator 27 will offer no delay in the attainment of a selected low brake cylinder pressure for effecting light application of brakes but will permit sufficient displacement of hydraulic fluid in the brake cylinder line 14 to delay the release and reapplication of a heavy application of brakes and thereby reduce the brake cylinder pressure cycling frequency and throw it out of phase with the natural flexure frequency of the landing gear, for effectively damping out the above-described "walking" condition.

Having now described the invention, what I claim as new and desire to secure by Letters Patent, is:

1. In a hydraulic brake system for controlling braking of an aircraft landing wheel, the combination with a landing gear that operatively carries the landing wheel and is flexibly "walkable" backward and forward when brakes are applied and released, a control line in which hydraulic fluid is provided at a pressure corresponding to a degree of brake application desired, a brake cylinder, and an anti-wheel slide controller device including valve means normally in one position to connect said brake cylinder with said control line and operable to another position to disconnect the brake cylinder from the control line and connect the brake cylinder to a release communication in bypass of the control line, and including retardation sensing means operatively connected to the wheel and operably responsive to a rate of retardation of the wheel exceeding a predetermined permissive rate to actuate said valve means to its said other position and operably responsive to a retardation rate less than said permissive rate to actuate said valve means to its said one position, of an accumulator device including a casing communicating at one end only with said brake cylinder line and said brake cylinder, displaceable and imperforate means in said casing defining a first chamber at said one end of said casing and a second chamber on the other end of said casing, yieldable means in said second chamber for applying to said displaceable means in one position thereof a predetermined biasing force corresponding to a fraction of maximum brake line pressure in said brake cylinder opposingly to said pressure in said first chamber corresponding to said pressure in said brake line and said brake cylinder, said displaceable means being responsive to braking pressure in said brake cylinder exceeding said predetermined biasing force to increase the volume of said first chamber relative to said second chamber and thereby to vary the effective volume of the brake cylinder so that the release and application of brake line pressure to said brake cylinder caused by the operation of said valve means is delayed and out of phase with the flexure frequency of the landing gear.

2. The combination according to claim 1, wherein said constant preselected bias force corresponds to approximately twenty-five percent of the maximum brake cylinder pressure.

3. The combination according to claim 1, wherein said fraction is less than one half.

4. In a hydraulic brake system for controlling braking of an aircraft landing wheel, the combination of a flexible landing gear carrying the landing wheel, a source of hydraulic fluid under pressure, a brake cylinder for effecting an application of brakes or a release of brakes according to whether hydraulic pressure fluid is supplied thereto or released therefrom, a control line, a sump, a brake valve device operable to connect said control line to said source or said sump or bottle up pressure fluid in said control line to provide in said control line hydraulic fluid at a selectable pressure corresponding to the degree of brake application or brake release desired, a brake cylinder line leading to the brake cylinder, an anti-wheel-slide controller device including valve means normally in one position in which it connects said brake cylinder line to said control line and operable to another position in which it connects said brake cylinder line to said sump, and also including means operatively driven by the landing wheel and operable according to whether the rate of retardation of the landing wheel is within or exceeds a permissive limit to actuate said valve means to its said one position or other position, respectively, of an accumulator device including a casing communicating at one end only with said brake cylinder line and said brake cylinder, displaceable and imperforate means in said casing defining a first chamber at said one end and a second chamber on the other end of said casing, said displaceable means being displaceable to and from a predetermined limit position, yieldable means in said second chamber for applying a predetermined biasing force corresponding to a fraction of maximum brake line pressure in said brake cylinder opposingly to said brake line pressure in said first chamber so that said displaceable means is yieldably held in said first limit position and the volume of said first chamber remains constant at brake line pressures below said opposing predetermined biasing force, so as to permit substantially instantaneous application and release of said brake line pressure to said brake cylinders, said displaceable means being responsive to brake line pressure in said brake cylinder exceeding said predetermined biasing force to move to and away from said limit position upon application and release respectively of said excessive brake line pressure so as to vary the volume of said first chamber and thereby to vary the effective volume of said brake cylinders so that the release and application of brake line pressure in said brake cylinder is delayed and out of phase with the flexure frequency of the landing gear.

References Cited in the file of this patent

UNITED STATES PATENTS

| | | |
|---|---|---|
| 2,289,273 | Klaburner | July 7, 1942 |
| 2,535,854 | Hertrich | Dec. 26, 1950 |
| 2,656,017 | Trevaskis | Oct. 20, 1953 |
| 2,718,938 | Berkoben | Sept. 27, 1955 |
| 2,753,017 | Curl et al. | July 3, 1956 |
| 2,759,690 | Dewar | Aug. 21, 1956 |
| 2,810,535 | Albright | Oct. 22, 1957 |